(12) United States Patent
Banik et al.

(10) Patent No.: US 12,252,755 B2
(45) Date of Patent: Mar. 18, 2025

(54) PROCESS FOR MANUFACTURING A FLAT STEEL PRODUCT HAVING AN ALUMINUM-BASED CORROSION-RESISTANT COATING, AND FLAT STEEL PRODUCT HAVING AN ALUMINUM-BASED CORROSION-RESISTANT COATING

(71) Applicant: ThyssenKrupp Steel Europe AG, Duisburg (DE)

(72) Inventors: Janko Banik, Altena (DE); Dirk Rosenstock, Essen (DE); Axel Ralf Schrooten, Dortmund (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 0 days.

(21) Appl. No.: 18/020,338

(22) PCT Filed: Aug. 17, 2021

(86) PCT No.: PCT/EP2021/072833
§ 371 (c)(1),
(2) Date: Feb. 8, 2023

(87) PCT Pub. No.: WO2022/038135
PCT Pub. Date: Feb. 24, 2022

(65) Prior Publication Data
US 2023/0304117 A1   Sep. 28, 2023

(51) Int. Cl.
*C22C 38/02*   (2006.01)
*B32B 15/01*   (2006.01)
(Continued)

(52) U.S. Cl.
CPC .......... *C21D 9/0081* (2013.01); *B32B 15/012* (2013.01); *C21D 1/42* (2013.01);
(Continued)

(58) Field of Classification Search
CPC ....... B32B 15/012; C22C 38/02; C22C 38/04; C22C 38/06; C22C 38/12; C22C 38/14;
(Continued)

(56) References Cited

U.S. PATENT DOCUMENTS

2011/0056554 A1  3/2011  Yamamoto et al.
2011/0165436 A1  7/2011  Drillet et al.
(Continued)

FOREIGN PATENT DOCUMENTS

DE  102008006771   9/2009
DE  102014112448   11/2016
(Continued)

OTHER PUBLICATIONS

DIN EN 10083-3—Steels for quenching and tempering—Part 3: Technical delivery conditions for alloy steels, Jan. 2007.
(Continued)

*Primary Examiner* — Katherine A Christy
(74) *Attorney, Agent, or Firm* — RMCK Law Group PLC (57) ABSTRACT

A process for manufacturing a flat steel product having a prealloyed corrosion-resistant coating, comprises providing a coated flat steel product comprising a steel substrate having, at least on one side of the steel substrate, and an aluminum-based corrosion-resistant coating. The coated flat steel product is heat-treated, comprising the following substeps: Heating the coated flat steel product in a furnace at a furnace temperature T of between 950° C. and 1150° C. with a furnace dwell time $t_V$ of between 40 seconds and 150 seconds, the furnace temperature being chosen such that the heating rate of the coated flat steel product in the temperature range from 500° C. to 700° C. is more than 10 K/s. The coated flat steel product is held at a temperature above Ac3 for a hold time of between 20 seconds and 60 seconds.

9 Claims, 4 Drawing Sheets

(51) Int. Cl.
  *C21D 1/42* (2006.01)
  *C21D 6/00* (2006.01)
  *C21D 8/02* (2006.01)
  *C21D 9/00* (2006.01)
  *C22C 38/00* (2006.01)
  *C22C 38/04* (2006.01)
  *C22C 38/06* (2006.01)
  *C22C 38/12* (2006.01)
  *C22C 38/14* (2006.01)
  *C22C 38/22* (2006.01)
  *C22C 38/26* (2006.01)
  *C22C 38/28* (2006.01)
  *C22C 38/32* (2006.01)
  *C22C 38/38* (2006.01)
  *C23C 2/12* (2006.01)
  *C23C 2/28* (2006.01)

(52) U.S. Cl.
  CPC .............. *C21D 6/00* (2013.01); *C21D 6/002* (2013.01); *C21D 6/005* (2013.01); *C21D 6/008* (2013.01); *C21D 8/0205* (2013.01); *C21D 8/0221* (2013.01); *C21D 8/0247* (2013.01); *C21D 8/0278* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/22* (2013.01); *C22C 38/26* (2013.01); *C22C 38/28* (2013.01); *C22C 38/32* (2013.01); *C22C 38/38* (2013.01); *C23C 2/12* (2013.01); *C23C 2/28* (2013.01)

(58) Field of Classification Search
  CPC ......... C22C 38/22; C22C 38/26; C22C 38/28; C22C 38/32; C22C 38/38; C23C 2/12
  USPC ....................................................... 428/653
  See application file for complete search history.

(56) References Cited

U.S. PATENT DOCUMENTS

| | | |
|---|---|---|
| 2011/0174418 A1 | 7/2011 | Maki et al. |
| 2012/0085467 A1 | 4/2012 | Thirion et al. |
| 2014/0030544 A1 | 1/2014 | Maki et al. |
| 2016/0311197 A1 | 10/2016 | Becker et al. |
| 2016/0362763 A1 | 12/2016 | Oh et al. |
| 2016/0362764 A1 | 12/2016 | Sohn et al. |
| 2016/0376679 A1 | 12/2016 | Kim et al. |
| 2018/0142337 A1 | 5/2018 | Kim |
| 2019/0003029 A1 | 1/2019 | Oh et al. |
| 2019/0054513 A1 | 2/2019 | Hielscher et al. |
| 2019/0381764 A1 | 12/2019 | Kang et al. |
| 2020/0086608 A1 | 3/2020 | Oh et al. |
| 2023/0086620 A1* | 3/2023 | Oh ..................... C23C 28/023 428/577 |

FOREIGN PATENT DOCUMENTS

| | | | | |
|---|---|---|---|---|
| EP | 0224863 B1 | 3/1991 | | |
| EP | 0971044 B1 | 5/2003 | | |
| EP | 2312005 A1 | 4/2011 | | |
| EP | 2695963 A1 | 2/2014 | | |
| EP | 3211103 A1 | 8/2017 | | |
| EP | 2086755 B1 | 11/2017 | | |
| EP | 3239336 A1 | 11/2017 | | |
| EP | 3239337 A1 | 11/2017 | | |
| EP | 3239338 A1 | 11/2017 | | |
| EP | 3305938 A1 | 4/2018 | | |
| EP | 3396010 A1 | 10/2018 | | |
| EP | 2886332 B1 | 11/2018 | | |
| EP | 3889313 A1 * | 10/2021 | .......... | B32B 15/012 |
| KR | 20200066237 A * | 6/2020 | | |
| WO | 2018117716 A1 | 6/2018 | | |
| WO | 2018117769 A1 | 6/2018 | | |

OTHER PUBLICATIONS

DIN EN ISO 20567-1, Paints and varnishes—Determination of stone-ship resistance of coatings—Part 1: Multi-impact testing.
International Search Report and Written Opinion for International Application No. PCT/EP2021/072833 mailed Nov. 19, 2021.
ISO 2409—Paints and varnishes—Cross-cut test—International Standard, Fifth edition, Aug. 2020.
SEP 1220—Testing and Documentation Guideline for the Joinability of thin sheet of steel—Part 2: Resistance Spot Welding, Aug. 1, 2011.
Taylor, T. et al., "Critical review of automotive hot-stamped sheet steel from an industrial perspective" Materials Science and Technology, GB, vol. 34, No. 7, Jan. 18, 2018.

* cited by examiner

PROCESS FOR MANUFACTURING A FLAT STEEL PRODUCT HAVING AN ALUMINUM-BASED CORROSION-RESISTANT COATING, AND FLAT STEEL PRODUCT HAVING AN ALUMINUM-BASED CORROSION-RESISTANT COATING

CROSS-REFERENCE TO RELATED APPLICATIONS

This application is a 371 U.S. National Stage of International Application No. PCT/EP2021/072833, filed Aug. 17, 2021, which claims the benefit of International Patent Application No. PCT/EP2020/073159 filed Aug. 19, 2020. The disclosures of each of the above applications are incorporated herein by reference in their entirety.

The invention relates to a process for manufacturing a flat steel product having a prealloyed corrosion-resistant coating.

The invention also relates to a flat steel product having a prealloyed corrosion-resistant coating.

The invention further relates to a process for manufacturing a steel component having a fully alloyed corrosion-resistant coating.

Lastly the invention relates to a steel component having a fully alloyed corrosion-resistant coating.

The term "flat steel product" here encompasses all rolled products with a length very much greater than their thickness. These include steel strips, steel sheets, and also pre-cut blanks and other blanks obtained from such strips and sheets.

Any figures given here for amounts/contents in alloys should always be understood as figures in "wt %", unless expressly indicated otherwise.

Percentage figures for structure constituents and for fractions of phases in the layer are based on the volume (vol %), unless otherwise indicated. The values are determined, however, as percentages by area in a metallographic section.

A prealloyed corrosion-resistant coating is a coating into which a certain fraction of iron has diffused, but in which complete, full alloying has not yet been attained. A prealloyed corrosion-resistant coating is therefore characterized in that the Fe content is between 30 and 45 wt %, preferably between 30 and 40 wt %, more preferably between 35 and 40 wt %. In contrast, the Fe content of the fully alloyed corrosion-resistant coating is significantly higher and is at least 45 wt %, more particularly at least 50 wt %, preferably 50 wt % to 70 wt %. As elucidated later on, the corrosion-resistant coating optionally comprises different layers and phases. In that case the Fe content of the corrosion-resistant coating should be understood as an average over the various layers and phases.

The steel substrate of flat steel products of the invention consists more particularly of what is called "MnB steel". Steels of this kind are standardized in EN 10083-3. These steels possess good hardenability and enable a reliable hot pressing regime that makes it possible economically to bring about martensite hardening while still in the tool in the course of the hot deformation, without additional cooling.

Typical steels suitable for hot press hardening are the steels A-E with the chemical compositions as listed in table 2.

The steel substrate may likewise be implemented as a composite material having, for example, three steel layers, of which at least one layer is temporable, more particularly hardenable; cf. EP 2 886 332 B1.

For hot-rolled MnB steel sheets which have been provided with an aluminum-based corrosion-resistant coating and which are intended for the production of steel components by hot press hardening, EP 0 971 044 B1 specifies an alloying protocol whereby an MnB steel, in addition to iron and unavoidable impurities, is to have (in wt %) a carbon content of more than 0.20% but less than 0.5%, a manganese content of more than 0.5% but less than 3%, a silicon content of more than 0.1% but less than 0.5%, a chromium content of more than 0.01% but less than 1%, a titanium content of less than 0.2%, an aluminum content of less than 0.1%, a phosphorus content of less than 0.1%, a sulfur content of less than 0.05%, and a boron content of more than 0.0005% but less than 0.08%.

The aluminum-based corrosion-resistant coating is what is called an AlSi coating, containing 3-15 wt % of Si, and up to 3.5 wt % of iron. The corrosion-resistant coating preferably contains 9-10 wt % of Si and 2-3.5 wt % of iron. The percentages are based on the corrosion-resistant coating before the heat treatment. In one specific variant, further to the stated alloy elements Si and Fe, the corrosion coating contains only aluminum and unavoidable impurities. The balance is therefore aluminum and unavoidable impurities. The flat steel products thus constituted and coated are heated to a heating temperature above the Ac1 temperature, then inserted into a press shaping tool, where they are shaped hot to form the steel component, which immediately thereafter, with the press shaping tool kept closed, is cooled at a rate such that hardness structure is formed in the steel substrate of the flat steel product. In the course of this operation, more particularly during the heating, Fe diffuses out of the steel substrate into the Al coating. Consequently Fe is introduced into the alloy, causing the coating to harden fully.

The typical heating procedure for the hot press hardening described, however, is significantly longer for Al-coated MnB steel than for uncoated material, being 4-6 minutes rather than 3-4 minutes, for example. This is due to the poorer coupling of heat into the temporarily reflective coating, and also to the timespan needed for the full alloying of the coating. This time can in principle be shortened by choosing a higher furnace temperature for the hot press hardening. At furnace temperatures >940° C., however, in conjunction with a rapid heating rate, the press-hardened surface has a reduced roughness and therefore the adhesion of coating material in the course of subsequent further processing is inadequate.

DE 10 2008 006 771 B3 therefore proposes a two-stage process in which the coated steel substrate is subjected to a first heating step and to a second heating step. The first heating step is accompanied by prealloying of the aluminum-based coating. In the prealloyed state, the flat steel products can then be transported from the steel producer to the processor. The second heating step, with the hot press hardening, then takes place at the premises of the processor. As a result of the division of the process, the process time for the second heating step at the processor's can be shortened significantly. The first heating step according to DE 10 2008 006 771 B3 takes an hour or more and occurs at temperatures of 550-723° C.

DE 10 2014 112 448 B4 likewise proposes a process, whose objective, however, is the complete, full alloying of a hardenable steel sheet having an aluminum-silicon coating. The alloying procedure is performed until the coating is saturated with iron from the steel and so there is only a small process window for the subsequent heating, since this results in formation of thick layers which are detrimental to the suitability of the hardened steel sheet component for welding.

It is an object of the present invention to develop the aforesaid processes in such a way that the overall operational time can be shortened and at the same time a flat steel product having improved properties is formed.

This object is achieved by a process for manufacturing a flat steel product having a prealloyed corrosion-resistant coating, comprising at least the following steps:

Providing a coated flat steel product comprising a steel substrate having, at least on one side of the steel substrate, an aluminum-based corrosion-resistant coating Heat-treating the coated flat steel product, comprising the following substeps:

heating the coated flat steel product in a furnace at a furnace temperature T of between 950° C. and 1150° C., preferably between 960° C. and 1080° C., more particularly 980° C. and 1060° C., with a furnace dwell time $t_F$ of between 40 s and 150 s, the furnace temperature being chosen such that the heating rate of the coated flat steel product in the temperature range from 500° C. to 700° C. is more than 10 K/s holding the coated flat steel product at a temperature above Ac3 for a hold time of between 20 s and 60 s.

This operating window has a number of advantages. The relatively short furnace dwell time in conjunction with the high furnace temperatures means that there is reliable prealloying of the corrosion-resistant coating, while at the same time the mechanotechnical characteristics of the steel product are not impaired and the basic structure of the steel substrate is retained in terms of its constituents.

The heating rate here is measured close to the surface, using a near-surface thermocouple, for example, since for the operations in question the temperature of the layer or the temperature of the contact region between layer and substrate is relevant, and not the core temperature of the steel substrate.

The steel substrate is typically a steel with ferritic-pearlitic structure, preferably a manganese-boron steel with ferritic-pearlitic structure, more preferably a manganese-boron-steel with ferritic-pearlitic structure that can be converted by heat treatment, in the form of a thermal hardening treatment, into a martensitic structure.

The steel material consists of a hardenable steel material. The steel material has preferably the following chemical composition in wt %:

C=0.05 to 0.5, preferably 0.1 to 0.4 wt %,
Mn=0.3 to 3.0 wt %,
Si=0.05 to 1.7 wt %,
P up to 0.1 wt %,
S up to 0.1 wt %,
N up to 0.1 wt %,
and optionally one or more alloy elements from the group of (Al, Ti, V, Nb, B, Cr, Mo, Cu, Ni, Ca):
Al up to 1.0 wt %,
Ti up to 0.2 wt %,
V up to 0.5 wt %,
Nb up to 0.5 wt %,
B up to 0.01 wt %,
Cr up to 1.0 wt %,
Mo up to 1.0 wt %,
Cu up to 1.0 wt %,
Ni up to 1.0 wt %,
Ca up to 0.1 wt %,
Balance Fe and unavoidable impurities.

The steel substrate is more preferably a steel from the group of the steels A-E whose chemical analysis is reported in table 2. This table 2 is to be understood such that for each steel from the group of the steels A-E, the elemental fractions are reported in percent by weight. A minimum and a maximum weight fraction are stated. For example, then, the steel A comprises a carbon fraction C: 0.05 wt %-0.10 wt %. If the lower limit is 0, the element may be understood as being optional. Where there is no entry in the table, there is no restriction on the element. For the elements chromium and molybdenum only an upper limit is provided, for the steels C-E, for the sum total of the amounts of chromium and molybdenum. In addition to the elements listed in the table, the steels A-E may contain further optional elements, e.g., Cu, N, Ni, V, Sn, Ca. The balance consists in each case of iron.

The aluminum-based corrosion-resistant coating is preferably what is called an AlSi coating, which contains 0.5-15 wt % of Si, optionally up to 5 wt % of iron, optionally up to 5 wt % of alkali metals or alkaline earth metals, preferably up to 1.0 wt % of alkali metals or alkaline earth metals, and optionally up to 15 wt % of Zn, preferably up to 10 wt % of Zn, and optional further constituents, the amounts of which are restricted in total to at most 2.0 wt %, and aluminum as the balance.

In one preferred variant, the optional amount of alkali metals or alkaline earth metals comprises 0.1-1.0 wt % of Mg, more particularly 0.1-0.7 wt % of Mg, preferably 0.1-0.5 wt % of Mg. The optional content of alkali metals or alkaline earth metals in the melt may further comprise in particular at least 0.0015 wt % of Ca, more particularly at least 0.01 wt % of Ca.

The aluminum-based corrosion-resistant coating is preferably what is called an AlSi coating, which contains 0.5-15 wt % of Si, optionally up to 5 wt % of iron, optionally up to 5 wt % of magnesium, balance aluminum. The corrosion-resistant coating preferably contains 3-15 wt % of Si, more particularly 5-11 wt % of Si, more particularly 7-10 wt % of Si, and 2-3.5 wt % of iron. The magnesium fraction is preferably 0.05 to 1 wt %, more particularly 0.1 to 0.5 wt %.

The division of the first heat treatment into a first substep, in which the flat steel product is heated, and a second substep, in which the flat steel product is held at a temperature above Ac3, has the advantage that accidental overheating of the corrosion-resistant coating can be avoided. Overheating may result in a lowering of the spot-weldability and of the coating-material adhesion of the hot press-hardened steel component. In the second substep, therefore, the coated flat steel product is held preferably at a temperature between Ac3 and 950° C.

The use of a two-stage process with the described first heat treatment and a second treatment in the case of the actual hot press hardening has the advantage that in the second step, which is carried out at the premises of the processor of the flat steel product, the product present is already a flat steel product with a prealloyed corrosion-resistant coating. The heat treatment at the processor of the flat steel product is typically carried out in a roller hearth furnace. A disadvantage of untreated, aluminum-based coatings is that during the heat treatment they take on a partially fluid state and lead to deposits on the furnace rollers. This in turn leads to unstable heating operations, to increased rejection due to mispositioning of the heated flat steel products, and to increased maintenance expenditure due to defective furnace rollers. All of this can be prevented by the further processing of a flat steel product having a prealloyed corrosion-resistant coating manufactured in accordance with the invention. Because of the iron fraction, introduced by diffusion, in the aluminum-based corrosion-resistant coating, there has been an increase in the melting point of the corrosion-resistant coating, and so there is no longer any further fluidification in the course of a subsequent heating operation for hot press hardening. As a result, the deposition on furnace rollers is also avoided.

The heating rate of more than 10 K/s in the temperature range from 500° C. to 700° C. has the advantage, moreover, that a low-silicon phase and a silicon-rich phase are formed in the corrosion-resistant coating. The silicon-rich phase here is distributed insularly in the low-silicon phase. Because of the heating rate of more than 10 K/s, there is also a uniform distribution of the insular silicon-rich phase in the low-silicon phase. This ensures that the hot press-hardened steel component has uniformly distributed silicon-rich areas within a low-silicon phase even in the near-surface region of the corrosion-resistant coating. As a result, the steel component has an improved spot-weldability.

The prealloyed flat steel product also reliably has a roughness, with a mean roughness $R_a$ in the range from 0.3 µm to 2.0 µm, preferably 0.5 µm to 1.6 µm. This ensures that the hot press-hardened steel component likewise has sufficient roughness to achieve effective coating-material adhesion.

By "insular" is meant, in the sense of the present application, an arrangement in which discrete, unconnected regions are surrounded by a different material—that is, there are "islands" of one particular material in another material.

A low-silicon phase means a phase whose silicon fraction is 1-10 wt %, preferably 1-6 wt %.

A silicon-rich phase means a phase whose silicon fraction is greater than 10 wt %, preferably 10-15%.

In the case of one preferred variant, the heating rate in the temperature range from 500° C. to 700° C. is less than 20 K/s. This produces a stable operating window, with the desired flat steel product thus being obtained reliably even in the event of slight variation in the dwell time.

In one specific variant of the process, the corrosion-resistant coating is disposed on both sides of the steel substrate and has a both-sides add-on weight r of between $$50 \frac{g}{m^2}$$

and $$200 \frac{g}{m^2}.$$

The dwell time $t_V$ in that case is subject preferably to the following criterion:

$$\left(48 + 5.5 \cdot \left(\frac{1050° C. - T}{50K}\right)\right) \frac{s}{mm} \cdot d \cdot \left(0.3 \cdot \ln\left(r \cdot \frac{m^2}{g}\right) - 0.5\right) <$$

$$t_V < \left(85 + 8.5 \cdot \left(\frac{1050° C. - T}{50K}\right)\right) \frac{s}{mm} \cdot d \cdot \left(0.3 \cdot \ln\left(r \cdot \frac{m^2}{g}\right) - 0.5\right)$$

where
T=furnace temperature in ° C.
d=thickness of the flat steel product in mm
$t_V$=furnace dwell time in s
r=both-sides add-on weight in $$\frac{g}{m^2}$$

This relationship enables a reliable operating window for different thicknesses and add-on weights of the corrosion-resistant coating.

A both-sides add-on weight refers to the sum total of the add-on weights on both coated sides. For a flat steel product coated on both sides, therefore, the numerical value is not the add-on weight per coated side, but rather the sum total of the two add-on weights on each side.

The thickness of the flat steel product is more particularly 0.5-3.5 mm, preferably 0.8-2.8 mm.

The flat steel product provided with the corrosion-resistant coating prealloyed in accordance with the invention can subsequently be cooled to room temperature and stored before being supplied for further processing to give the respective steel component. This is done typically by cooling in ambient air. The cooling rate here is preferably less than 5 K/s, more particularly less than 3.5 K/s, between the furnace temperature and 200° C. Because the corrosion-resistant coating in the described first heating stage is only incompletely alloyed (i.e., less than 5% Fe fraction in the region bordering the surface and having a thickness of 1.0 µm, in other words the region of up to 1.0 µm beneath the surface of the corrosion-resistant coating), the corrosion-resistant coating has a low susceptibility to corrosion even after the first heating stage, and so its storage, its transport, and the further steps of work carried out preliminary to the second heating stage can be carried out without problems, and with the need for additional measures for this purpose. At the same time, the prealloyed corrosion-resistant coating retains properties which even after the first heating stage still enable the resultant flat steel products to be trimmed or to be cut up with simple cutting operations, without lasting damage to the coating layer in the process.

The invention further relates to a flat steel product having a prealloyed corrosion-resistant coating, comprising a steel substrate having, at least on one side of the steel substrate, a prealloyed, aluminum-based corrosion-resistant coating. The martensite fraction of the steel substrate here is preferably less than 10 vol %, preferably less than 5 vol %, and the average Fe content of the corrosion-resistant coating is 30-45 wt %. Moreover, the corrosion-resistant coating comprises:

a low-silicon phase, which in addition to unavoidable impurities contains 1-10 wt % of Si, 10-50 wt % of Fe, up to 1 wt % of Mn and 40-80 wt % of aluminum, with the sum of the constituents present being 100 wt %, and a silicon-rich phase, which in addition to unavoidable impurities contains 10-15 wt % of Si, 25-50 wt % of Fe, up to 1 wt % of Mn and 40-80 wt % of aluminum, with the sum of the constituents present being 100 wt % and with the silicon-rich phase being distributed insularly in the low-silicon phase.

A flat steel product of this kind with a prealloyed corrosion-resistant coating may be generated, for example, by the process described above, and has the advantages described above. In particular the mean roughness $R_a$ of the prealloyed flat steel product is in the range from 0.3 µm to 2.0 µm, preferably 0.5 µm to 1.6 µm. This ensures that the hot press-hardened steel component likewise has sufficient roughness to achieve effective coating-material adhesion.

The thickness of the flat steel product is in particular 0.5-3.5 mm, preferably 0.8-2.8 mm.

The insular distribution of the silicon-rich phase in the low-silicon phase in the case of the flat steel product with a prealloyed corrosion-resistant coating is such in particular that the silicon-rich phase has discrete, unconnected regions which are surrounded by the low-silicon phase. Discrete, unconnected regions in the section, having a surface area of less than 100 µm$^2$, make up more than 80% of the total silicon-rich phase. More particularly, discrete, unconnected regions having a surface area of less than 50 µm$^2$ make up more than 50% of the total silicon-rich phase. In other words, more than 80% of the silicon-rich phase is present in the form of small "islands" whose surface area is less than 100 µm$^2$, and preferably more than 50% of the silicon-rich phase is in the form of small "islands" whose surface area is less than 50 µm$^2$.

In one preferred variant, the insular distribution of the silicon-rich phase in the low-silicon phase is such that the areas with silicon-rich phase are distributed over a region whose thickness perpendicular to the surface is at least greater than 50% of the thickness of the corrosion-resistant coating. Therefore, rather than the formation of a single narrow strip with areas of silicon-rich phases, the silicon-rich areas are distributed insularly over a strip which occupies at least half of the corrosion-resistant coating. It is ensured, furthermore, that in the hot press-hardened steel component, the corrosion-resistant coating, more particularly the near-surface region of the corrosion-resistant coating, has between 10 vol % and 25 vol % of the silicon-rich phase. This means in turn that the hot press-hardened steel component has uniformly distributed silicon-rich areas within a low-silicon phase in the near-surface region of the corrosion-resistant coating. A result of this is an improved spot-weldability of the steel component.

In one preferred variant, the fraction of the silicon-rich phase in the prealloyed corrosion-resistant coating is greater than 5 vol %, preferably greater than 10 vol %.

In one preferred variant of the flat steel product with prealloyed corrosion-resistant coating, the Fe content of the corrosion-resistant coating at each point is more than 10 wt % of Fe. An advantage of this is that the melting point at each point is sufficiently high to prevent parts of the corrosion-resistant coating becoming fluidized during the subsequent hot press hardening.

In one preferred variant of the flat steel product with prealloyed corrosion-resistant coating, the flat steel product comprises a diffusion layer comprising Fe3Al and Fe2Al5 with a thickness of between 1 µm and 6 µm, disposed adjacent to the steel substrate. The diffusion layer therefore borders the steel substrate directly and contacts the steel substrate. The diffusion layer is frequently also referred to as a ferrite seam. A diffusion layer of this kind improves the cutting behavior when the flat steel product with prealloyed corrosion-resistant layer is being cut to size, owing to the soft transition between the hard coating and the (comparatively) softer substrate.

Moreover, in one preferred variant, the flat steel product comprises a layer of the silicon-rich phase with a thickness of between 1 µm and 3 µm which is disposed adjacent to the diffusion layer. The layer of the silicon-rich phase therefore directly borders the diffusion layer and contacts the diffusion layer. The chemical composition of the layer of the silicon-rich phase is the same as that of the insularly distributed areas with silicon-rich phase. The layer of the silicon-rich phase grows just like the diffusion layer during the prealloying procedure.

A further-developed variant of the flat steel product with a prealloyed corrosion-resistant coating comprises an oxide layer at the surface of the corrosion-resistant coating. The oxide layer is formed spontaneously by reaction with atmospheric oxygen and comprises substantially aluminum oxide $Al_2O_3$ or, in the case of the variant embodiment with magnesium in the corrosion-resistant coating, comprises MgO and $Al_2O_3$. Typically the fraction of MgO in the oxide layer is 55% to 65% and the fraction of aluminum oxide is about 35% to 45%.

The thickness of the oxide layer in both cases is typically 20 nm to 300 nm, preferably 50 nm to 200 nm, and additionally protects the flat steel product from corrosion.

The invention additionally relates to a process for manufacturing a steel component having a fully alloyed corrosion-resistant coating, comprising at least the following steps:

providing an above-described flat steel product having a prealloyed corrosion coating heating the flat steel product with prealloyed corrosion coating to a forming temperature $T_U$ of between Ac3 and 950° C. for a heating time $t_E$ of between 2 s and 600 s, more particularly 5 s and 600 s, preferably 20 s and 400 s, more preferably 60 s and 240 s.

The procedure of heating the flat steel product for a heating time $t_E$ comprises the raising of the temperature to the forming temperature $T_U$ in the stated temperature range and the holding of the flat steel product at this forming temperature $T_U$.

The heating may be carried out by means of a short roller hearth furnace, a chamber furnace, or rapid heating (conductively, inductively or contact heating).

As a result of the use of the flat steel product with prealloyed corrosion-resistant coating it is sufficient for the subsequent heating to be carried out in the short heating time described. There is no need for any additional time to be kept in reserve in order to enable the full alloying of the corrosion-resistant coating. In some cases, therefore, it is even possible to synchronize the operating steps downstream of the heating, such as transfer to the press, forming, press hardening, optional cutting, and transfer to the receiving station, for example, with the duration of heating, so that there is little or no time delay.

A further advantage of using the flat steel product with prealloyed corrosion-resistant coating is that the heating can be carried out in a roller hearth furnace without any need to fear deposits on the furnace rollers. As a result of the iron fraction, introduced by diffusion, in the aluminum-based corrosion-resistant coating, the melting point of the corrosion-resistant coating has increased, and so there is no longer any fluidization during the subsequent heating operation for the hot press hardening. Consequently deposition on furnace rollers is prevented as well.

In particular, the process described for manufacturing a steel component having a fully alloyed corrosion-resistant coating is developed further in such a way that the heating time $t_E$ is subject to the following criterion:

$$\left(55\frac{s}{mm} \cdot d + 32s - \left(0.7\frac{s}{K} \cdot (T_U - 890° C.)\right)\right) < t_E$$

and/or $$t_E < \left(85\frac{s}{mm} \cdot d + 260s - \left(3\frac{s}{K} \cdot (T_U - 890°C.)\right)\right)$$

where
$T_U$=forming temperature
d=thickness of the flat steel product in mm
$t_E$=heating time in s The thickness of the flat steel product is in particular 0.5-3.5 mm, preferably 0.8-2.8 mm.

The lower limit on the heating time ensures that the diffusion layer which borders the steel substrate, which is already present or which is newly formed has a thickness of at least 1 µm. A diffusion layer thickness of more than 1 µm is a good indicator that the full alloying has attained a sufficient level.

The upper limit on the heating time ensures that the diffusion layer which borders the steel substrate, which is already present or which forms newly has a thickness of not more than 10 µm. Larger thicknesses for the diffusion layer are detrimental to the coating-material adhesion and to the spot-weldability of the steel component.

The process described for manufacturing a steel component having a fully alloyed corrosion-resistant coating more particularly further comprises the step of:
  forming the flat steel product in a forming tool to give a steel component.
In the forming tool the flat steel product is not only shaped to give the steel component, but at the same time is quenched to the target temperature as well. The cooling rate to the target temperature in the forming tool is in particular at least 20 K/s, preferably at least 30 K/s, more particularly at least 50 K/s, very preferably at least 100 K/s. The target temperature is below 400° C., preferably below 300° C. Preferably, furthermore, the target temperature is at least 50° C. As a result, the martensite content attained in the substrate is more than 50 vol %, preferably more than 80 vol %, more particularly more than 90 vol %, more particularly more than 95 vol %.

After the steel component has been removed from the forming tool, the steel component is cooled to a cooling temperature T of less than 50° C. within a cooling time of 0.5 to 600 s. This is generally accomplished by air cooling.

The invention additionally relates to a steel component having a fully alloyed corrosion-resistant coating, comprising a steel substrate having, present at least on one side of the steel substrate, a fully alloyed, aluminum-based corrosion-resistant coating. A steel component of this kind may have been manufactured in particular by the process described above. The fully alloyed corrosion-resistant coating here comprises:
  a low-silicon phase, which in addition to unavoidable impurities contains 1-10 wt % of Si, preferably 1-6 wt % of Si, 40-60 wt % of Fe, up to 1 wt % of Mn and 30-60 wt % of aluminum,
  a silicon-rich phase (R), which in addition to unavoidable impurities contains 10-15 wt % of Si, 40-70 wt % of Fe, up to 1 wt % of Mn and 40-80 wt % of aluminum, the silicon-rich phase being distributed insularly in the low-silicon phase.

The Fe content in the fully alloyed corrosion-resistant coating is at least 45 wt %, more particularly at least 50 wt %, preferably 50 wt % to 70 wt %.

The insular distribution of the silicon-rich phase in the low-silicon phase here is such that the corrosion-resistant coating, more particularly the near-surface region of the corrosion-resistant coating, has between 10 vol % and 25 vol % of the silicon-rich phase. The silicon-rich islands ensure good spot-weldability. They also increase the roughness of the steel component, producing a mean roughness $R_a$ of greater than 1 µm. The mean roughness is preferably greater than 1.2 µm, more preferably greater than 1.5 µm. This ensures effective coating-material adhesion.

The martensite content of the steel substrate is more than 50 vol %, preferably more than 80 vol %, more particularly more than 90 vol %, more particularly more than 95 vol %.

The corrosion-resistant coating optionally comprises up to 5 wt % of magnesium, preferably 0.05 to 1 wt %, more particularly 0.1 to 0.5 wt % of magnesium.

The magnesium content of the corrosion-resistant coating is more particularly 0.1 to 0.5 wt % of magnesium. At the same time, regions of the low-silicon phase and of the silicon-rich phase that have a distance from the surface of the corrosion-resistant coating of more than 1.0 µm each have a magnesium fraction of up to 0.5 wt %. Since the forming operation may cause an accumulation of magnesium in the region of the surface, the magnesium fraction in the two phases near to the surface may be above 0.5 wt %. In the low-lying phases described, however, the magnesium content is not more than 0.5 wt %.

A further-developed variant of the steel component having a fully alloyed corrosion-resistant coating comprises an oxide layer at the surface of the corrosion-resistant coating. The oxide layer is formed spontaneously by reaction with atmospheric oxygen and comprises substantially aluminum oxide Al2O3 or, in the case of the variant embodiment with magnesium in the corrosion-resistant coating, comprises MgO and Al2O3. Typically the fraction of MgO in the oxide layer is 55% to 65% and the fraction of aluminum oxide is about 35% to 45%.

The thickness of the oxide layer in both cases is typically 20 nm to 300 nm, preferably 50 nm to 200 nm, and provides the steel component with additional protection from corrosion.

The near-surface region of the (prealloyed or fully alloyed) corrosion-resistant coating refers, in the sense of the present application, to the region down to a depth of 200 nm beneath the surface of the corrosion-resistant coating. The surface of the corrosion-resistant coating refers here to the contact region with the surrounding atmosphere or with the oxide layer.

In one preferred variant, the fraction of the silicon-rich phase in the fully alloyed corrosion-resistant coating is less than 20 vol %, preferably less than 15 vol %.

The insular distribution of the silicon-rich phase in the low-silicon phase in the case of the steel component with a fully alloyed corrosion-resistant coating is in particular such that the silicon-rich phase has discrete, unconnected regions which are surrounded by the low-silicon phase. Discrete, unconnected regions having a surface area here of less than 100 µm$^2$ make up more than 80% of the total silicon-rich phase. In particular, discrete, unconnected regions having a surface area of less than 50 µm$^2$ make up more than 50% of the total silicon-rich phase. In other words, more than 80% of the silicon-rich phase is present in the form of small "islands" whose surface area is less than 100 µm$^2$, and preferably more than 50% of the silicon-rich phase is present in the form of small "islands" whose surface area is less than 50 µm$^2$.

In one preferred variant, the steel component comprises a diffusion layer, more particularly comprising Fe3Al and Fe2Al5, having a thickness of between 1 µm and 20 µm, which is disposed adjacent to the steel substrate. The diffusion layer therefore directly borders the steel substrate and contacts the steel substrate. In one preferred variant, the thickness of the diffusion layer is at least 3 μm. In particular the thickness is not more than 16 μm, more preferably not more than 12 μm. The thickness of the diffusion layer is a good indicator of the degree of full alloying. It has emerged that with the thickness ranges indicated, the desired full alloying is achieved.

In the case of one preferred variant, the fraction of pores in the corrosion-resistant coating is less than 5 vol %. In the presence of a diffusion layer, the fraction of pores, based on corrosion-resistant coating and diffusion layer, is less than 5 vol %. Just like the fraction of the phases, the fraction of pores is determined by measurement of the surface area in a polished section.

In the case of a further preferred variant, the steel component comprises a layer of the silicon-rich phase having a thickness of between 1 μm and 3 μm, disposed adjacent to the diffusion layer. The layer of the silicon-rich phase therefore borders the diffusion layer directly on the side remote from the substrate, and contacts the diffusion layer. On the other side, the diffusion layer contacts the corrosion-resistant coating. The layer of the silicon-rich phase has the same chemical composition as the insularly distributed areas with silicon-rich phase.

The invention is elucidated in more detail with the following working examples in conjunction with the figures, in which.

WORKING EXAMPLE 1

Shaped blanks were cut from a strip of steel type D from table 2, 1.8 mm thick and with a 25 μm thick, aluminum-based corrosion-resistant coating on both sides. The cutting method employed comprised a punching tool and a laser. The initial composition of the protective coating was 8 wt % Si, 3 wt % Fe, 0.3 wt % Mg, balance Al. The add-on weight was $$70 \frac{g}{m^2}$$

on each side. These shaped blanks, in a two-zone continuous furnace, were first heated to more than 900° C. in the first zone at a furnace temperature of 1100° C., in 105 seconds. The heating rate between 500° C. and 700° C. was 12 K/s. The blank was then held at 920° C. temperature for 35 seconds, this being above the Ac3 temperature, which for the type of steel selected is about 860° C. Within this time, prealloying of the corrosion-resistant coating occurred. The Fe content of the corrosion-resistant coating subsequently was between 35 wt % and 40 wt %. Moreover, the Fe content of the corrosion-resistant coating at each point was more than 10 wt % Fe. The mean roughness $R_a$ for this variant embodiment is 0.9 μm.

Figure 1A:
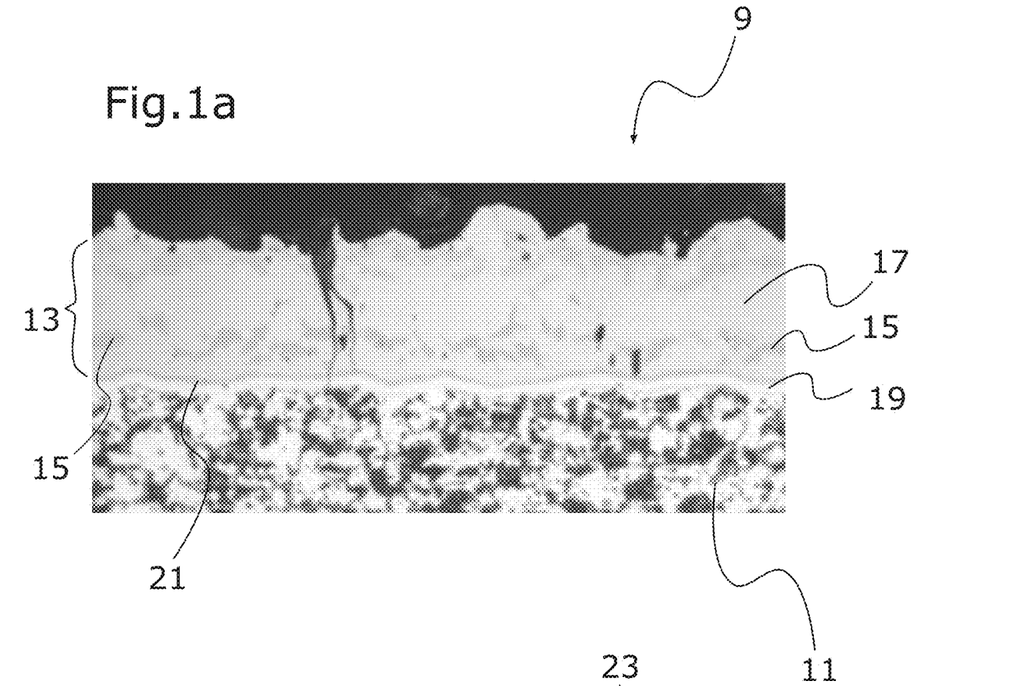
FIG. 1a shows a polished cross section of a flat steel product having a prealloyed corrosion-resistant coating in a first variant embodiment.

The polished cross section of the resultant flat steel product 9 is represented in FIG. 1a. On a steel substrate 11, a corrosion-resistant coating 13 is disposed. The corrosion-resistant coating 13 comprises a silicon-rich phase 15 and a low-silicon phase 17. Clearly apparent is the insular distribution of the silicon-rich phase 15 in the low-silicon phase 17. The areas with silicon-rich phase 15 are distributed over a region which has a thickness, perpendicular to the surface, of about 80% of the thickness of the corrosion-resistant coating 13. What is formed, therefore, is not a single narrow strip with areas of silicon-rich phases 15; instead, the silicon-rich areas are distributed insularly over a strip which occupies about 80% of the corrosion-resistant coating. This ensures that in the hot-pressed steel component, the fraction of the silicon-rich phase 15 in the corrosion-resistant coating is between 10 vol % and 25 vol %.

With this variant of the flat steel product with prealloyed corrosion-resistant coating, the flat steel product comprises a diffusion layer 19 comprising Fe3Al and Fe2Al5 with a thickness of 3 μm, disposed adjacent to the steel substrate 11. The diffusion layer 19 therefore borders the steel substrate 11 directly and contacts the steel substrate 11. The corrosion-resistant coating 13 further comprises a layer 21 of the silicon-rich phase 15 with a thickness of 1 μm, disposed adjacent to the diffusion layer 19. The layer 21 of the silicon-rich phase 15 therefore borders the diffusion layer 19 directly and contacts the diffusion layer 19.

In the case of this working example, moreover, the flat steel product comprises an oxide layer at the surface of the corrosion-resistant coating, having a thickness of 60 nm, which because of the resolution in FIG. 1a is not visible.

The shaped blanks treated in this way were processed further elsewhere on a hot forming line. The further processing took place in a short hot forming furnace at a forming temperature of 920° C. Complete austenitization and full alloying of the coating required a heating time of 150 seconds, in which the treated shaped blanks were brought to the forming temperature and held there. The furnace rollers of the hot forming furnace showed no Al soiling even after throughput of multiple 500 blanks.

After the hot press hardening, the corrosion-resistant coating contained an average of 51 wt % Fe and had silicon-rich areas with Si contents of between 10% and 14%. The corrosion-resistant coating does not show any clear layering of the silicon-rich and low-silicon areas. Instead, the silicon-rich phase is distributed insularly in the low-silicon phase. As a result of this, there are both low-silicon and silicon-rich phases present in the near-surface region. Not only the joining properties but also the coating-material adhesion properties were therefore better than for standard commercial aluminum-based corrosion-resistant coatings, in which a layering is formed with a continuous low-silicon layer in the near-surface region.

Figure 1B:
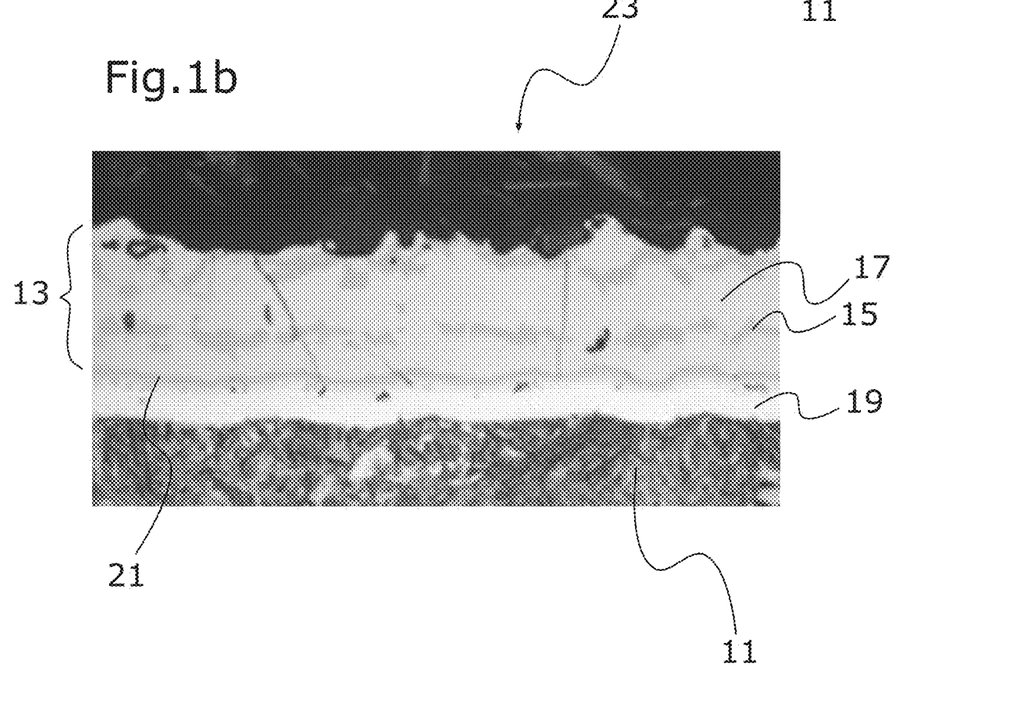
FIG. 1b shows a polished cross section of a steel component having a fully alloyed corrosion-resistant coating in a first variant embodiment.

The polished cross section of the resultant steel component 23 is represented in FIG. 1b. On a steel substrate 11, a corrosion-resistant coating 13 is disposed. The corrosion-resistant coating 13 comprises a silicon-rich phase 15 and a low-silicon phase 17. Clearly apparent is the insular distribution of the silicon-rich phase 15 in the low-silicon phase 17. The near-surface region has around 18 vol % of the silicon-rich phase 15. Moreover, the corrosion-resistant coating 13 and the diffusion layer 19 together have a pore fraction of 1.1%. The mean roughness of the surface is Ra=1.5 µm. The fraction of the silicon-rich phase in the corrosion-resistant coating is 14 vol %. About 85% of the silicon-rich phase is present in the form of small "islands" with a surface area of less than 100 µm².

The steel component 23 further comprises a diffusion layer 19 with Fe3Al and Fe2Al5, which is disposed adjacent to the steel substrate 11 beneath the corrosion-resistant coating 13. The diffusion layer 19 therefore borders the steel substrate 11 directly and contacts the steel substrate 11. The diffusion layer has a thickness of 7 µm. The steel component 23 further comprises a layer 21 of the silicon-rich phase 15, having a thickness of 2 µm, which is disposed adjacent to the diffusion layer 19 beneath the corrosion-resistant coating 13. The layer 21 of the silicon-rich phase 15 therefore borders the diffusion layer 19 directly and contacts the diffusion layer 19.

In this working example, the steel component further comprises an oxide layer at the surface of the corrosion-resistant coating, with a thickness of 100 nm, which because of the resolution in FIG. 1b is not visible.

WORKING EXAMPLE 2

Shaped blanks were cut from a strip of steel type E from table 2, 1.5 mm thick and with a 20 µm thick, aluminum-based corrosion-resistant coating on both sides. The cutting method employed was a laser. The initial composition of the protective coating was 10 wt % Si, 3 wt % Fe, balance Al. The add-on weight was 60 g/m², on each side.

These shaped blanks, in a two-zone continuous furnace, were first heated to more than 900° C. in the first zone at a furnace temperature of 1050° C., in 90 seconds. The heating rate between 500° C. and 700° C. was 11 K/s. This part of the furnace had an O2-containing atmosphere with a dew point DP of −10°. The blank was then held at 920° C. temperature for 60 seconds, this being above the Ac3 temperature, which for the type of steel selected is about 845° C. This part of the furnace had no dew point regulation.

Within this time, prealloying full alloying of the A S coating occurred. The Fe content of the corrosion-resistant coating subsequently was between 35 wt % and 40 wt %. Moreover, the Fe content of the corrosion-resistant coating at each point was more than 10 wt % Fe.

Figure 2A:
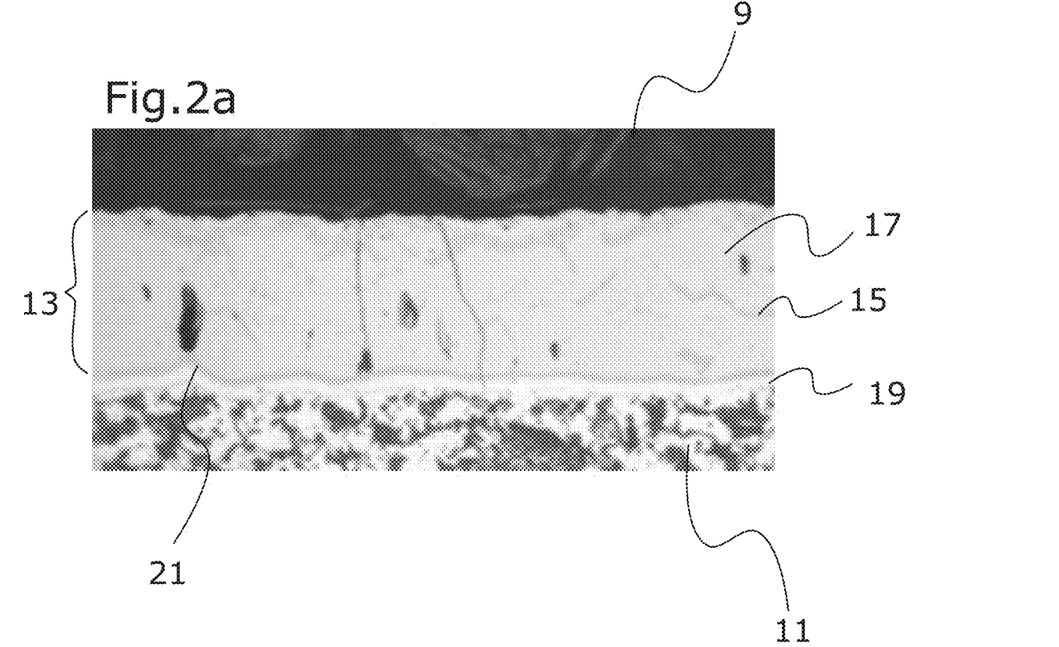
FIG. 2a shows a polished cross section of a flat steel product having a prealloyed corrosion-resistant coating in a second variant embodiment.

The polished cross section of the resultant flat steel product 9 is represented in FIG. 2a. On a steel substrate 11, a corrosion-resistant coating 13 is disposed. The corrosion-resistant coating 13 comprises a silicon-rich phase 15 and a low-silicon phase 17. Clearly apparent is the insular distribution of the silicon-rich phase 15 in the low-silicon phase 17. The areas with silicon-rich phase 15 are distributed over a region which has a thickness, perpendicular to the surface, of about 90% of the thickness of the corrosion-resistant coating 13. What is formed, therefore, is not a single narrow strip with areas of silicon-rich phases 15; instead, the silicon-rich areas are distributed insularly over a strip which occupies about 90% of the corrosion-resistant coating. This ensures that in the hot-pressed steel component, the near-surface region of the corrosion-resistant coating has between 10 vol % and 25 vol % of the silicon-rich phase.

With this variant of the flat steel product with prealloyed corrosion-resistant coating, the flat steel product comprises a diffusion layer comprising Fe3Al and Fe2Al5 with a thickness of 2 µm, disposed adjacent to the steel substrate 11. The diffusion layer 19 therefore borders the steel substrate 11 directly and contacts the steel substrate 11. The corrosion-resistant coating 13 further comprises a layer 21 of the silicon-rich phase 15 with a thickness of 1 µm, disposed adjacent to the diffusion layer 19. The layer 21 of the silicon-rich phase 15 therefore borders the diffusion layer 19 directly and contacts the diffusion layer 19.

In the case of this working example, moreover, the flat steel product comprises an oxide layer at the surface of the corrosion-resistant coating, having a thickness of 60 nm, which because of the resolution in FIG. 2a is not visible.

The shaped blanks thus treated were processed further in a separate operating step on an inductive rapid heating line. The heating time to 900° C. was 15 seconds. The blanks were subsequently held at this temperature by infrared radiation for a further 30 seconds at this temperature. This was accompanied by complete austenitization of the base material and full alloying of the coating. The heating time was therefore 45 seconds.

Figure 2B:
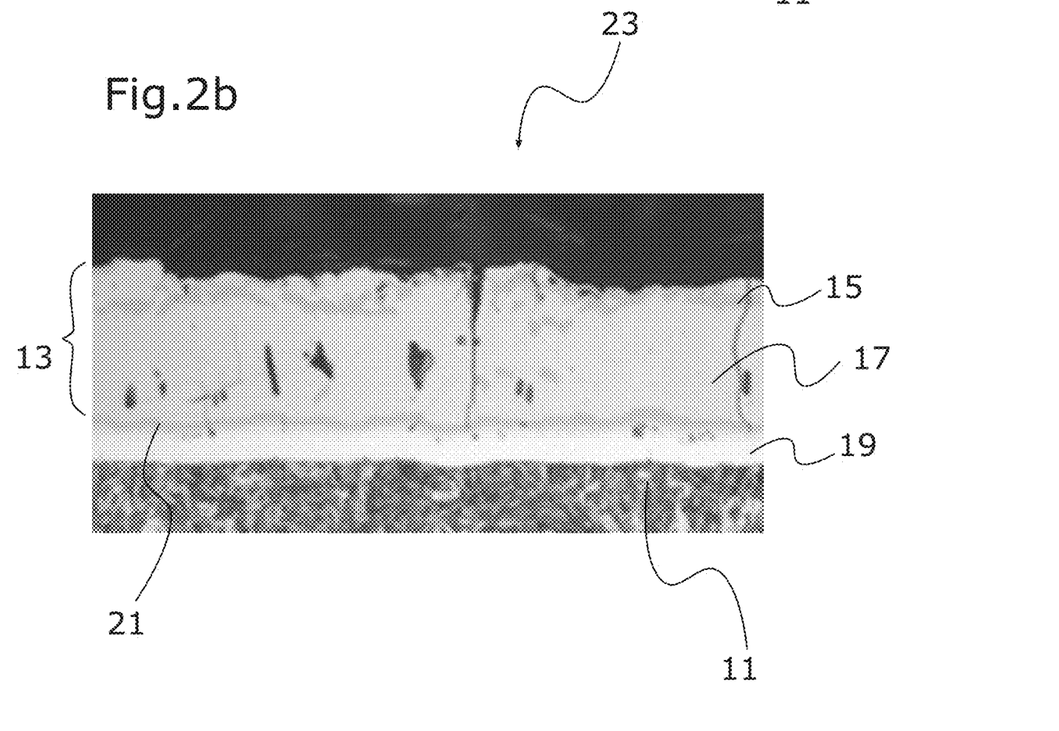
FIG. 2b shows a polished cross section of a steel component having a fully alloyed corrosion-resistant coating in a second variant embodiment.

After the hot press hardening, the corrosion-resistant coating contained an average of 56 wt % Fe and had silicon-rich areas with Si contents of between 10 wt % and 13.5 wt %. Above the diffusion layer, the corrosion-resistant coating does not show any clear layering of the silicon-rich and low-silicon areas. Instead, the silicon-rich phase is distributed insularly in the low-silicon phase. As a result of this, there are both low-silicon and silicon-rich phases present in the near-surface region. In this working example, the near-surface region of the corrosion-resistant coating had 18 vol % of the silicon-rich phase. Moreover, the corrosion-resistant coating 13 and the diffusion layer 19 together have a pore fraction of 2.3%. Not only the joining properties but also the coating-material adhesion properties were therefore better than for standard commercial aluminum-based corrosion-resistant coatings, in which a layering is formed with a continuous low-silicon layer in the near-surface region.

The polished cross section of the resultant steel component 23 is represented in FIG. 2b. On a steel substrate 11, a corrosion-resistant coating 13 is disposed. The corrosion-resistant coating 13 comprises a silicon-rich phase 15 and a low-silicon phase 17. Clearly apparent is the insular distribution of the silicon-rich phase 15 in the low-silicon phase 17. The near-surface region has around 23 vol % of the silicon-rich phase 15. The mean roughness is Ra=1.5 µm. The fraction of the silicon-rich phase in the corrosion-resistant coating is 11 vol %. More than 90% of the silicon-rich phase is present in the form of small "islands" with a surface area of less than 100 µm².

The steel component 23 further comprises a diffusion layer 19 with Fe3Al and Fe2Al5, which is disposed adjacent to the steel substrate 11 beneath the corrosion-resistant coating 13. The diffusion layer 19 therefore borders the steel substrate 11 directly and contacts the steel substrate 11. The diffusion layer has a thickness of 6 µm. The steel component 23 further comprises a layer 21 of the silicon-rich phase 15, having a thickness of 1 µm, which is disposed adjacent to the diffusion layer 19 beneath the corrosion-resistant coating 13. The layer 21 of the silicon-rich phase 15 therefore borders the diffusion layer 19 directly and contacts the diffusion layer 19.

In this working example, the steel component further comprises an oxide layer at the surface of the corrosion-resistant coating, with a thickness of 110 nm, which because of the resolution in FIG. 2b is not visible.

WORKING EXAMPLE 3

Shaped blanks were cut from a strip of steel type D from table 2, 1.2 mm thick and with a 20 μm thick, aluminum-based corrosion-resistant coating on both sides. The cutting method employed was a laser. The initial composition of the protective coating was 6 wt % Si, 3 wt % Fe, 0.3 wt % Mg, balance Al. The add-on weight was $$60 \frac{g}{m^2}$$

on each side.

These shaped blanks, in a two-zone continuous furnace, were first heated to more than 900° C. in the first zone at a furnace temperature of 1000° C., in 90 seconds. The heating rate between 500° C. and 700° C. was 13 K/s. This part of the furnace had an O2-containing atmosphere with a dew point of −15° C. The blank was then held at 920° C. temperature for 30 seconds, this being above the Ac3 temperature, which for the type of steel selected is about 860° C. Within this time, prealloying of the corrosion-resistant coating occurred. The Fe content of the corrosion-resistant coating subsequently was between 35 wt % and 40 wt %. Moreover, the Fe content of the corrosion-resistant coating at each point was more than 10 wt % Fe. The mean roughness $R_a$ for this variant embodiment is 1.2 μm.

Figure 3A:
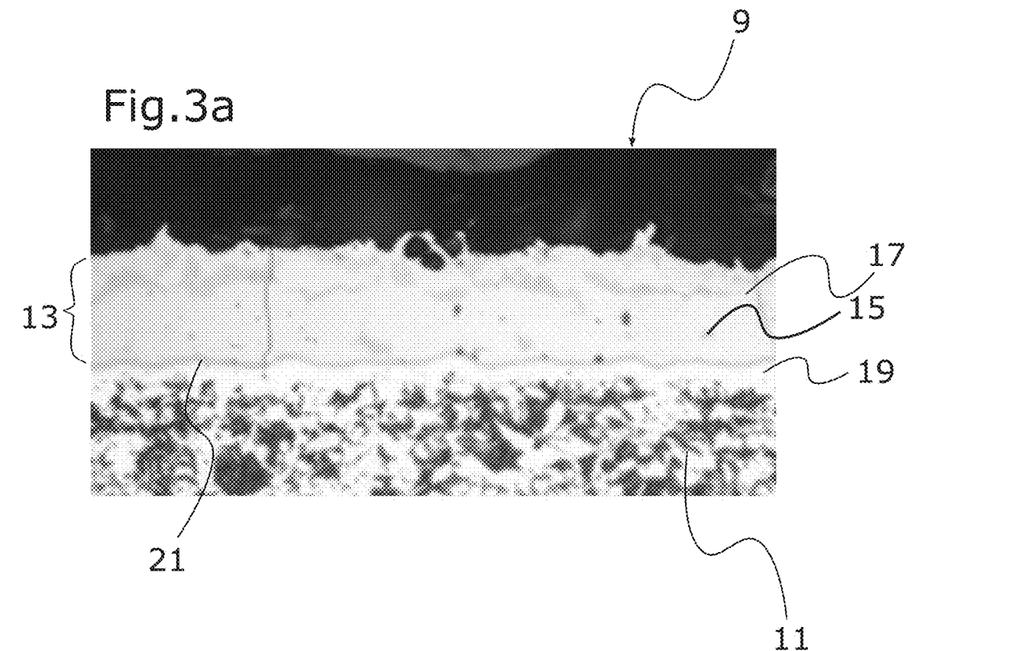
FIG. 3a shows a polished cross section of a flat steel product having a prealloyed corrosion-resistant coating in a third variant embodiment.

The polished cross section of the resultant flat steel product 9 is represented in FIG. 3a. On a steel substrate 11, a corrosion-resistant coating 13 is disposed. The corrosion-resistant coating 13 comprises a silicon-rich phase 15 and a low-silicon phase 17. Clearly apparent is the insular distribution of the silicon-rich phase 15 in the low-silicon phase 17. The areas with silicon-rich phase 15 are distributed over a region which has a thickness, perpendicular to the surface, of about 80% of the thickness of the corrosion-resistant coating 13. What is formed, therefore, is not a single narrow strip with areas of silicon-rich phases 15; instead, the silicon-rich areas are distributed insularly over a strip which occupies about 80% of the corrosion-resistant coating. This ensures that in the hot-pressed steel component the corrosion-resistant coating, in particular the near-surface region of the corrosion-resistant coating has between 10 vol % and 25 vol % of the silicon-rich phase.

With this variant of the flat steel product with prealloyed corrosion-resistant coating, the flat steel product comprises a diffusion layer comprising Fe3Al and Fe2Al5 with a thickness of 2.5 μm, disposed adjacent to the steel substrate 11. The diffusion layer 19 therefore borders the steel substrate 11 directly and contacts the steel substrate 11. The corrosion-resistant coating 13 further comprises a layer 21 of the silicon-rich phase 15 with a thickness of 0.5 μm, disposed adjacent to the diffusion layer 19. The layer 21 of the silicon-rich phase 15 therefore borders the diffusion layer 19 directly and contacts the diffusion layer 19.

In the case of this working example, moreover, the flat steel product comprises an oxide layer at the surface of the corrosion-resistant coating, having a thickness of 70 nm, which because of the resolution in FIG. 3a is not visible.

The shaped blanks thus treated were processed further elsewhere on a contact heating line. The heating time to the forming temperature of 900° C. was 20 seconds. The blank was subsequently held at this temperature via the infrared radiation of the contact plates for a further 75 seconds at this temperature, with the plates occupying a distance of around 5 mm from the blank surface. This was accompanied by complete austenitization of the steel substrate and by full alloying of the corrosion-resistant coating. The heating time was therefore 95 seconds. Because of the prealloyed corrosion-resistant coating, there were no instances of sticking to the contact plates. The layer thickness of the corrosion-resistant coating also remained constant over the plate area.

After the hot press hardening, the corrosion-resistant coating contained an average of 60 wt % Fe and had silicon-rich areas with Si contents of between 11% and 15%. Above the diffusion layer, the corrosion-resistant coating does not show any clear layering of the silicon-rich and low-silicon areas. Instead, the silicon-rich phase is distributed insularly in the low-silicon phase. As a result of this, there are both low-silicon and silicon-rich phases present in the near-surface region. Not only the joining properties but also the coating-material adhesion properties were therefore better than for standard commercial aluminum-based corrosion-resistant coatings, in which a layering is formed with a continuous low-silicon layer in the near-surface region.

Figure 3B:
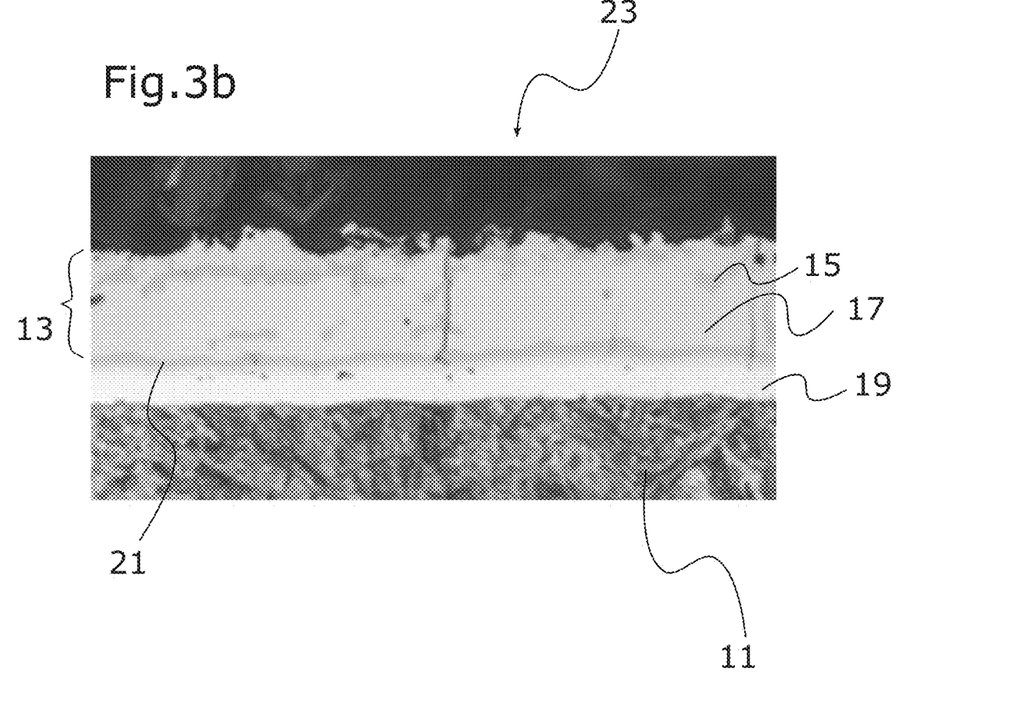
FIG. 3b shows a polished cross section of a steel component having a fully alloyed corrosion-resistant coating in a third variant embodiment.

The polished cross section of the resultant steel component 23 is represented in FIG. 3b. On a steel substrate 11, a corrosion-resistant coating 13 is disposed. The corrosion-resistant coating 13 comprises a silicon-rich phase 15 and a low-silicon phase 17. Clearly apparent is the insular distribution of the silicon-rich phase 15 in the low-silicon phase 17. The near-surface region has around 15 vol % of the silicon-rich phase 15. Moreover, the corrosion-resistant coating 13 and the diffusion layer 19 together have a pore fraction of 1.3%. The mean roughness is Ra=1.5 μm. The fraction of the silicon-rich phase in the corrosion-resistant coating is around 13 vol %. More than 90% of the silicon-rich phase is present in the form of small "islands" with a surface area of less than 100 μm².

The steel component 23 further comprises a diffusion layer 19 with Fe3Al and Fe2Al5, which is disposed adjacent to the steel substrate 11 beneath the corrosion-resistant coating 13. The diffusion layer 19 therefore borders the steel substrate 11 directly and contacts the steel substrate 11. The diffusion layer has a thickness of 9 μm. The steel component 23 further comprises a layer 21 of the silicon-rich phase 15, having a thickness of 2 μm, which is disposed adjacent to the diffusion layer 19 beneath the corrosion-resistant coating 13. The layer 21 of the silicon-rich phase 15 therefore borders the diffusion layer 19 directly and contacts the diffusion layer 19.

In this working example, the steel component further comprises an oxide layer at the surface of the corrosion-resistant coating, with a thickness of 220 nm, which because of the resolution in FIG. 3b is not visible.

WORKING EXAMPLE 4

Shaped blanks were cut from a strip of steel type D from table 2, 1.6 mm thick and with a 25 μm thick, aluminum-based corrosion-resistant coating on both sides. The cutting method employed was a laser. The initial composition of the protective coating was 8 wt % Si, 3 wt % Fe, 0.3 wt % Mg, balance Al. The add-on weight was $$75 \frac{g}{m^2}$$

on each side. The chemical composition was identical to working example 3.

These shaped blanks, in a two-zone continuous furnace, were first heated to more than 900° C. in the first zone by means of an infrared radiation array, in 60 seconds. The furnace temperature was 1050° C. The heating rate between 500° C. and 700° C. was 20 K/s. This part of the furnace had an O2-containing atmosphere with a dew point of −15° C. The blank was then held at 920° C. temperature for 45 seconds in a roller hearth furnace, this being above the Ac3 temperature, which for the type of steel selected is about 860° C. This part of the furnace had an O2-containing atmosphere with a dew point of +20° C. Within this time, prealloying of the corrosion-resistant coating occurred. The Fe content of the corrosion-resistant coating subsequently was between 40 wt % and 45 wt %. Moreover, the Fe content of the corrosion-resistant coating at each point was more than 10 wt % Fe. The mean roughness $R_a$ for this variant embodiment is 1.3 μm.

Figure 4A:
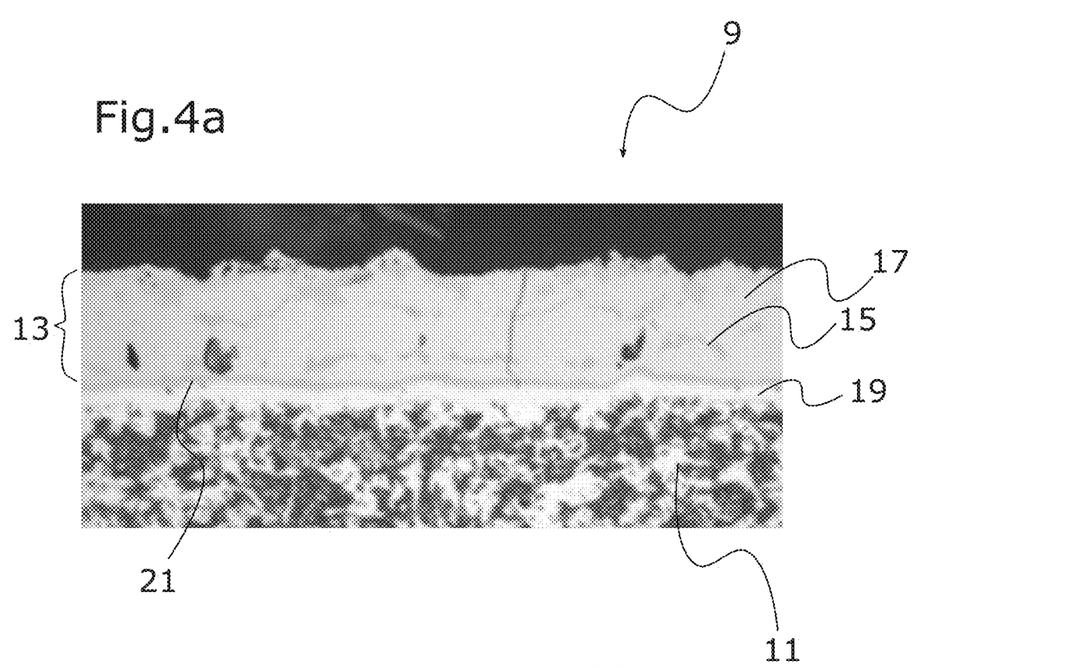
FIG. 4a shows a polished cross section of a flat steel product having a prealloyed corrosion-resistant coating in a fourth variant embodiment.

The polished cross section of the resultant flat steel product 9 is represented in FIG. 4a. On a steel substrate 11, a corrosion-resistant coating 13 is disposed. The corrosion-resistant coating 13 comprises a silicon-rich phase 15 and a low-silicon phase 17. Clearly apparent is the insular distribution of the silicon-rich phase 15 in the low-silicon phase 17. The areas with silicon-rich phase 15 are distributed over a region which has a thickness, perpendicular to the surface, of about 80% of the thickness of the corrosion-resistant coating 13. What is formed, therefore, is not a single narrow strip with areas of silicon-rich phases 15; instead, the silicon-rich areas are distributed insularly over a strip which occupies about 80% of the corrosion-resistant coating. This ensures that in the hot-pressed steel component the near-surface region of the corrosion-resistant coating has between 10 vol % and 25 vol % of the silicon-rich phase.

With this variant of the flat steel product with prealloyed corrosion-resistant coating, the flat steel product comprises a diffusion layer comprising Fe3Al and Fe2Al5 with a thickness of 3 μm, disposed adjacent to the steel substrate 11. The diffusion layer 19 therefore borders the steel substrate 11 directly and contacts the steel substrate 11. The corrosion-resistant coating 13 further comprises a layer 21 of the silicon-rich phase 15 with a thickness of 0.5 μm, disposed adjacent to the diffusion layer 19. The layer 21 of the silicon-rich phase 15 therefore borders the diffusion layer 19 directly and contacts the diffusion layer 19.

In the case of this working example, moreover, the flat steel product comprises an oxide layer at the surface of the corrosion-resistant coating, having a thickness of 110 nm, which because of the resolution in FIG. 4a is not visible.

The shaped blanks thus treated were processed further in a separate operating step in a contact heating operation by thermal conduction. The heating time to the forming temperature of 900° C. was 12 seconds. The blank was subsequently held at this temperature in a roller hearth furnace for a further 110 seconds at this temperature. This was accompanied by complete austenitization of the steel substrate and by full alloying of the corrosion-resistant coating. The heating time was therefore 122 seconds. Because of the prealloyed corrosion-resistant coating, there were no instances of sticking to the contact plates or furnace rollers. The layer thickness of the corrosion-resistant coating also remained constant over the plate area.

After the hot press hardening, the corrosion-resistant coating contained an average of 58 wt % Fe and had silicon-rich areas with Si contents of between 11% and 16%. Above the diffusion layer, the corrosion-resistant coating does not show any clear layering of the silicon-rich and low-silicon areas. Instead, the silicon-rich phase is distributed insularly in the low-silicon phase. As a result of this, there are both low-silicon and silicon-rich phases present in the near-surface region. Not only the joining properties but also the coating-material adhesion properties were therefore better than for standard commercial aluminum-based corrosion-resistant coatings, in which a layering is formed with a continuous low-silicon layer in the near-surface region.

Figure 4B:
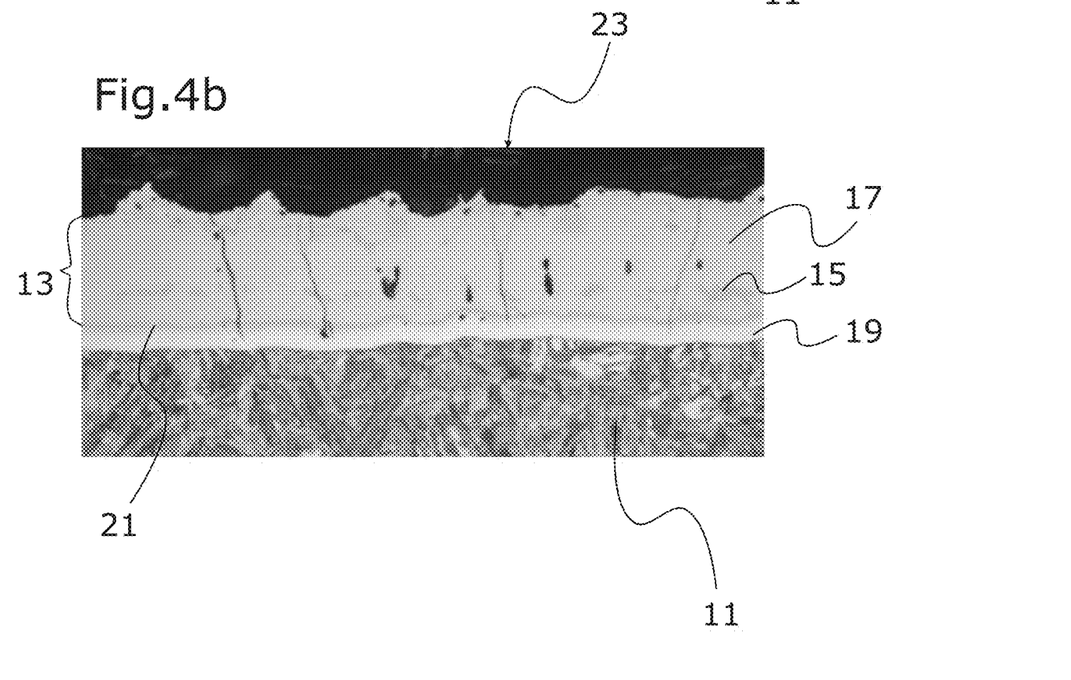
FIG. 4b shows a polished cross section of a steel component having a fully alloyed corrosion-resistant coating in a fourth variant embodiment.

The polished cross section of the resultant steel component 23 is represented in FIG. 4b. On a steel substrate 11, a corrosion-resistant coating 13 is disposed. The corrosion-resistant coating 13 comprises a silicon-rich phase 15 and a low-silicon phase 17. Clearly apparent is the insular distribution of the silicon-rich phase 15 in the low-silicon phase 17. The near-surface region has around 17 vol % of the silicon-rich phase 15. Moreover, the corrosion-resistant coating 13 and the diffusion layer 19 together have a pore fraction of 1.2%. The mean roughness is Ra=1.5 μm. The fraction of the silicon-rich phase in the corrosion-resistant coating is 10.5 vol %. More than 90% of the silicon-rich phase is present in the form of small "islands" with a surface area of less than 100 μm$^2$.

The steel component 23 further comprises a diffusion layer 19 with Fe3Al and Fe2Al5, which is disposed adjacent to the steel substrate 11 beneath the corrosion-resistant coating 13. The diffusion layer 19 therefore borders the steel substrate 11 directly and contacts the steel substrate 11. The diffusion layer has a thickness of 5 μm. The steel component 23 further comprises a layer 21 of the silicon-rich phase 15, having a thickness of 1 μm, which is disposed adjacent to the diffusion layer 19 beneath the corrosion-resistant coating 13. The layer 21 of the silicon-rich phase 15 therefore borders the diffusion layer 19 directly and contacts the diffusion layer 19.

In this working example, the steel component further comprises an oxide layer at the surface of the corrosion-resistant coating, with a thickness of 170 nm, which because of the resolution in FIG. 4b is not visible.

Further Working Examples

The table below reports the process parameters for shaped blanks in a variety of thicknesses. The type of steel in the steel substrate is likewise reported in the table. All of the shaped blanks include an aluminum-based corrosion-resistant coating 25 μm thick on both sides. The initial composition of the resistant coating was 9 wt % of Si, 3 wt % of Fe, balance Al. The add-on weight was $$70\frac{g}{m^2}$$

on each side.

These shaped blanks were heated to above 900° C. in a two-zone continuous furnace first in the first zone at 1050° C. furnace temperature. The heating rate between 500° C. and 700° C. was in all cases more than 10 K/s. The blanks were subsequently held in the second zone at a temperature of 950° C. for the hold time reported in table 1.

The shaped blanks thus treated were processed further elsewhere on a hot forming line. The further processing took place in a short hot forming furnace at a forming temperature of 900° C. or 920° C. After this, the thickness of the diffusion layer, the weldability, the coating-material adhesion and the tool abrasion were ascertained.

The weldability was ascertained in the form of suitability for resistance spot welding according to SEP1220-2.

For ascertaining the coating-material adhesion, firstly a stone chip test was carried out according to EN ISO 20567. The coated sample is subjected to defined bombardment with a defined amount of "corundum" and subjected to a VDA corrosion test. Secondly, the coating-material adhesion was also ascertained in accordance with EN ISO 2409 (cross-cut testing). In this case the coated sample is scored in a defined way, using a cross pattern, down to the metallic protective layer, and is likewise subjected to the VDA corrosion test.

The tool abrasion was ascertained by removing the pulverulent and adhering residues from the tool after a particular number of components produced, and was determined gravimetrically. Table 1 reports the mass of the abrasion after 100 formed components (cts) relative to one square meter of coated material. Beyond 100 g of abrasion per 1000 components (i.e., 10 g per 100 components), cleaning interventions outside of the plan might be necessary. Values below 10 g/100 components are therefore regarded as acceptable.

The invention claimed is:
1. A steel component having a corrosion-resistant coating, comprising a steel substrate having, at least on one side of the steel substrate, an aluminum-based corrosion-resistant coating, wherein the corrosion-resistant coating comprises:
 a diffusion layer comprising $Fe_3Al$ and $Fe_2Al_5$ with a thickness of between 1 μm and 20 μm which is disposed adjacent to the steel substrate,
 a low-silicon phase which contains, in addition to unavoidable impurities, 1-6 wt % of Si, 40-60 wt % of Fe, up to 1 wt % of Mn and 30-60 wt % of aluminum,
 a first silicon-rich phase which contains, in addition to unavoidable impurities, 10-15 wt % of Si, 40-70 wt % of Fe, up to 1 wt % of Mn and 40-80 wt % of aluminum, with the first silicon-rich phase being distributed insularly in the low-silicon phase and where the insular distribution of the silicon-rich phase in the low-silicon phase is such that the corrosion-resistant coating has between 10 vol % and 25 vol % of the first silicon-rich phase.

TABLE 1

| Sheet thickness (mm) | Steel type | Dwell time in 1st furnace zone Seconds | Hold time in 2nd furnace zone seconds | Forming temperature $T_U$ °C. | Heating time $t_E$ Seconds | Thickness of diffusion layer μm | RS weldability >1 kA = ok | Cathodic coating-material adhesion ≤1 = ok | Tool abrasion ≤10 g = ok | As per invention |
|---|---|---|---|---|---|---|---|---|---|---|
| 1.00 | B | 60 | 30 | 940 | 70 | 4 | 1.5 kA | 0-1 | 2 g/100 cts | yes |
| 1.25 | D | 75 | 38 | 880 | 60 | <1 | 1.2 kA | 1 | 10 g/100 cts | no |
| 1.25 | D | 75 | 38 | 890 | 100 | 5 | 1.5 kA | 0 | 0 g/100 cts | yes |
| 1.25 | D | 75 | 38 | 890 | 260 | 14 | 0.6 kA | 2 | 0 g/100 cts | no |
| 1.50 | D | 90 | 45 | 910 | 80 | 2 | 1.7 kA | 0-1 | 4 g/100 cts | yes |
| 1.50 | D | 90 | 45 | 920 | 150 | 5 | 2.0 kA | 0 | 0 g/100 cts | yes |
| 1.50 | D | 90 | 45 | 920 | 360 | 17 | 0.3 kA | 1 | 0 g/100 cts | yes |
| 2.00 | D | 120 | 60 | 920 | 105 | 1 | 1.3 kA | 1 | 15 g/100 cts | no |
| 2.00 | D | 120 | 60 | 920 | 180 | 5 | 1.8 kA | 0 | 0 g/100 cts | yes |
| 2.00 | D | 120 | 60 | 920 | 400 | 15 | 0.5 kA | 2-3 | 0 g/100 cts | no |
| 1.25 | D | 75 | 38 | 880 | 75 | 1-2 | 1.3 kA | 0-1 | 8 g/100 cts | yes |
| 1.25 | D | 75 | 38 | 890 | 120 | 5 | 1.6 kA | 0 | 0 g/100 cts | yes |
| 1.25 | D | 75 | 38 | 890 | 360 | 14 | 0.5 kA | 1 | 0 g/100 cts | no |
| 1.50 | D | 90 | 45 | 920 | 90 | 2 | 1.3 kA | 0-1 | 5 g/100 cts | yes |
| 1.50 | D | 90 | 45 | 920 | 180 | 6 | 1.8 kA | 0 | 0 g/100 cts | yes |
| 1.50 | D | 90 | 45 | 920 | 360 | 16 | 0.3 kA | 1-2 | 0 g/100 cts | no |
| 2.00 | D | 120 | 60 | 900 | 90 | 1 | 1.4 kA | 1 | 12 g/100 cts | no |
| 2.00 | D | 120 | 60 | 900 | 205 | 4 | 1.6 kA | 0-1 | 0 g/100 cts | yes |
| 2.00 | D | 120 | 60 | 900 | 480 | 15 | 0.4 kA | 2 | 0 g/100 cts | no |
| 1.50 | B | 90 | 45 | 920 | 150 | 5 | 1.7 kA | 0 | 2 g/100 cts | yes |
| 1.50 | B | 90 | 45 | 920 | 150 | 6 | 1.8 kA | 0 | 4 g/100 cts | yes |
| 1.50 | B | 90 | 45 | 920 | 150 | 5 | 1.4 kA | 0-1 | 0 g/100 cts | yes |
| 1.50 | C | 90 | 45 | 920 | 150 | 5 | 1.7 kA | 0 | 5 g/100 cts | yes |
| 1.50 | C | 90 | 45 | 920 | 150 | 5 | 1.7 kA | 0-1 | 0 g/100 cts | yes |
| 1.50 | C | 90 | 45 | 920 | 150 | 7 | 2.0 kA | 0 | 0 g/100 cts | yes |
| 1.50 | D | 90 | 45 | 920 | 150 | 6 | 1.6 kA | 0 | 1 g/100 cts | yes |
| 1.50 | D | 90 | 45 | 920 | 150 | 5 | 1.9 kA | 0-1 | 0 g/100 cts | yes |
| 1.50 | D | 90 | 45 | 920 | 150 | 6 | 1.8 kA | 0-1 | 2 g/100 cts | yes |
| 2.50 | E | 150 | 75 | 900 | 200 | 3 | 1.6 KA | 1 | 3 g/100 cts | yes |

TABLE 2

| Steel type | min/max | C | Si | Mn | P | S | Al | Nb | Ti | Cr + Mo | B |
|---|---|---|---|---|---|---|---|---|---|---|---|
| A | min | 0.05 | 0.05 | 0.50 | 0.000 | 0.000 | 0.015 | 0.005 | 0.000 | | 0.0000 |
|  | max | 0.10 | 0.35 | 1.00 | 0.030 | 0.025 | 0.075 | 0.100 | 0.150 | | 0.0050 |
| B | min | 0.05 | 0.03 | 0.50 | 0.000 | 0.000 | 0.015 | 0.005 | 0.000 | | 0.0000 |
|  | max | 0.10 | 0.50 | 2.00 | 0.030 | 0.025 | 0.075 | 0.100 | 0.150 | | 0.0050 |
| C | min | 0.05 | 0.05 | 1.00 | 0.000 | 0.000 | 0.015 | 0.005 | 0.000 | 0.00 | 0.0010 |
|  | max | 0.16 | 0.40 | 1.40 | 0.025 | 0.010 | 0.150 | 0.050 | 0.050 | 0.50 | 0.0050 |
| D | min | 0.10 | 0.05 | 1.00 | 0.000 | 0.000 | 0.005 | | 0.000 | 0.00 | 0.0010 |
|  | max | 0.30 | 0.40 | 1.40 | 0.025 | 0.010 | 0.050 | | 0.050 | 0.50 | 0.0050 |
| E | min | 0.25 | 0.10 | 1.00 | 0.000 | 0.000 | 0.015 | | 0.000 | 0.00 | 0.0010 |
|  | max | 0.4 | 0.40 | 1.40 | 0.025 | 0.010 | 0.050 | | 0.050 | 0.50 | 0.0500 |

2. The steel component as claimed in claim 1, wherein the fraction of the first silicon-rich phase in the corrosion-resistant coating is between 10 vol % and 20 vol %.

3. The steel component as claimed in claim 2, wherein the steel component comprises:
a layer of the silicon-rich phase with a thickness of between 1 μm and 3 μm, which is disposed adjacent to the diffusion layer.

4. The steel component of claim 1, wherein the diffusion layer comprises a thickness of between 1 μm and 6 μm which is disposed adjacent to the steel substrate.

5. The steel component of claim 4, further comprising:
a layer of a second silicon-rich phase with a thickness of between 1 μm and 3 μm, which is disposed adjacent to the diffusion layer, wherein the second silicon-rich phase contains, in addition to unavoidable impurities, 10-15 wt % of Si, 40-70 wt % of Fe, up to 1 wt % of Mn and 40-80 wt % of aluminum.

6. The steel component as claimed in claim 1, wherein the fraction of the first silicon-rich phase in the corrosion-resistant coating is between 10 vol % and 15 vol %.

7. The steel component as claimed in claim 1, wherein the first silicon-rich phase has discrete, unconnected regions which are surrounded by the low-silicon phase, the discrete unconnected regions having a surface area of less than 100 μm$^2$ that make up more than 80% of the first silicon-rich phase.

8. The steel component of claim 1, wherein the first silicon-rich phase has discrete, unconnected regions which are surrounded by the low-silicon phase, the discrete unconnected regions having a surface area of less than 50 μm$^2$ that make up more than 50% of the first silicon-rich phase.

9. The steel component of claim 1, wherein a near-surface region of the corrosion-resistant coating has between 10 vol % and 25 vol % of the first silicon-rich phase.

* * * * *